US012533904B2

(12) United States Patent
Mori

(10) Patent No.: US 12,533,904 B2
(45) Date of Patent: Jan. 27, 2026

(54) THERMAL TRANSFER SHEET, AND COMBINATION OF THERMAL TRANSFER SHEET AND INTERMEDIATE TRANSFER MEDIUM

(71) Applicant: Dai Nippon Printing Co., Ltd., Tokyo (JP)

(72) Inventor: Emi Mori, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 34 days.

(21) Appl. No.: 18/006,433

(22) PCT Filed: Aug. 4, 2021

(86) PCT No.: PCT/JP2021/028930

§ 371 (c)(1),
(2) Date: Jan. 23, 2023

(87) PCT Pub. No.: WO2022/030537

PCT Pub. Date: Feb. 10, 2022

(65) Prior Publication Data

US 2023/0264506 A1 Aug. 24, 2023

(30) Foreign Application Priority Data

Aug. 5, 2020 (JP) ................................ 2020-133233

(51) Int. Cl.
*B41M 5/385* (2006.01)
*B41M 5/382* (2006.01)
*B41M 5/42* (2006.01)

(52) U.S. Cl.
CPC ........ *B41M 5/385* (2013.01); *B41M 5/38214* (2013.01); *B41M 5/38257* (2013.01);
(Continued)

(58) Field of Classification Search
CPC .......... B41M 5/38214; B41M 5/38257; B41M 5/385; B41M 5/42; B41M 5/426; B41M 2205/10; B41M 2205/30; B41M 2205/38
See application file for complete search history.

(56) References Cited

U.S. PATENT DOCUMENTS 7,507,452 B2 * 3/2009 Odamura .............. B41M 5/345 428/32.75
2004/0209774 A1 10/2004 Odamura et al.
(Continued)

FOREIGN PATENT DOCUMENTS

CN 1910243 A 2/2007
CN 102653192 A 9/2012
(Continued)

OTHER PUBLICATIONS

Product info of Iriodin 223 acquired from https://surface-portal.emdgroup.com/US/en/product/PM/103530 on Oct. 11, 2024.*
(Continued)

*Primary Examiner* — Gerard Higgins
(74) *Attorney, Agent, or Firm* — BURR PATENT LAW, PLLC

(57) ABSTRACT

The present disclosure is a thermal transfer sheet including a substrate and a transfer layer, the transfer layer containing a luster pigment, wherein, when an image of the sheet is taken from a side on which the transfer layer is present, the image is analyzed, dark and light portions of the analyzed image are inverted, automatic thresholding is performed in order to determine a threshold value of a brightness distribution, binary representation is subsequently performed, and the number and the total area of the black portions and the total area of the white portions are calculated, the ratio of the total area of the black portions to the total area of the white
(Continued)

portions is 0.03 to 0.5, and the black portions have an average area of 100 to 300 $\mu m^2$.

7 Claims, 3 Drawing Sheets

(52) U.S. Cl.
CPC .............. *B41M 5/42* (2013.01); *B41M 5/426* (2013.01); *B41M 2205/10* (2013.01); *B41M 2205/30* (2013.01); *B41M 2205/38* (2013.01)

(56) References Cited

U.S. PATENT DOCUMENTS

| | | | | |
|---|---|---|---|---|
| 2007/0134179 | A1 | 6/2007 | Ino et al. | |
| 2012/0225775 | A1 | 9/2012 | Yasumatsu | |
| 2019/0092040 | A1 | 3/2019 | Yoda et al. | |
| 2022/0332136 | A1 * | 10/2022 | Daike | B41M 5/38207 |
| 2022/0371350 | A1 | 11/2022 | Matsuba et al. | |

FOREIGN PATENT DOCUMENTS

| | | | | | |
|---|---|---|---|---|---|
| CN | 114364543 | A | | 4/2022 | |
| JP | H07-117368 | A | | 5/1995 | |
| JP | H08-085269 | A | | 4/1996 | |
| JP | H09-156242 | A | | 6/1997 | |
| JP | 2001162937 | A | * | 6/2001 | |
| JP | 2003-094841 | A | | 4/2003 | |
| JP | 2004-142445 | A | | 5/2004 | |
| KR | 10-2018-0121973 | A | | 11/2018 | |
| WO | WO-2021066016 | A1 | * | 4/2021 | B41M 5/382 |

OTHER PUBLICATIONS

English translation of the International Preliminary Report on Patentability (Chapter I) dated Feb. 16, 2023 (Application No. PCT/JP2021/028930).
Extended European Search Report (Application No. 21853758.7) dated Jul. 9, 2024 (7 pages).
International Search Report and Written Opinion (Application No. PCT/JP2021/028930) dated Oct. 19, 2021.
Chinese Office Action dated Oct. 31, 2024 (Application No. 202180056828.7).
English translation of the Chinese Office Action dated Oct. 31, 2024 (Application No. 202180056828.7).
Korean Office Action (with English translation) dated May 29, 2025 (Application No. 10-2023-7006162).
Chinese Office Action (Application No. 202180056828.7) dated Nov. 6, 2025 (with English translation) (10 pages).

* cited by examiner

THERMAL TRANSFER SHEET, AND COMBINATION OF THERMAL TRANSFER SHEET AND INTERMEDIATE TRANSFER MEDIUM

TECHNICAL FIELD

The present disclosure relates to a thermal transfer sheet, and a combination of the thermal transfer sheet and an intermediate transfer medium.

BACKGROUND ART

Luster pigments have a gloss and a quality appearance compared with common pigments. Therefore, luster pigments are included in printing inks, cosmetics, paints, and the like.

For example, in PTL 1, it is suggested that a printed material having a high-brightness metallic gloss can be produced by using a thermal transfer sheet that includes a thermal transfer ink layer containing a luster pigment, such as a specific inorganic pearl pigment.

CITATION LIST

Patent Literature

PTL 1: Japanese Unexamined Patent Application Publication No. H8-85269

SUMMARY OF INVENTION

Technical Problem

The present disclosers made attempts to produce a printed material having a high brightness by transferring a layer containing a luster pigment to an image formed on a transfer-receiving article. However, the present disclosers found that the above printed material is inferior to common printed materials in terms of durability and image visibility. The present disclosers also found that the thermal transfer sheet used for producing the printed material having a high brightness has lower transferability than common thermal transfer sheets.

An object of the present disclosure is to provide a thermal transfer sheet with which a printed material having an excellent brightness and enhanced durability and image visibility can be produced and which has enhanced transferability and a combination of the thermal transfer sheet and an intermediate transfer medium.

Solution to Problem

The thermal transfer sheet according to the present disclosure includes a substrate and a transfer layer.

The transfer layer contains a luster pigment.

When an image of the thermal transfer sheet is taken from a side on which the transfer layer is present using an optical microscope at a 500-fold magnification in order to obtain an 8-bit grayscale image, the image is analyzed with image analysis software, dark and light portions of the analyzed image are inverted, automatic thresholding is then performed by an ISODATA method in order to determine a threshold value of a brightness distribution of the analyzed image, binary representation is subsequently performed such that portions in which brightness is less than the threshold value are colored in black and portions in which brightness is equal to or more than the threshold value are colored in white, and the number and the total area of the black portions and the total area of the white portions are calculated, a ratio of the total area of the black portions to the total area of the white portions is 0.03 or more and 0.5 or less, and the black portions have an average area of 100 $\mu m^2$ or more and 300 $\mu m^2$ or less.

The combination according to the present disclosure is a combination of the thermal transfer sheet and an intermediate transfer medium.

Advantageous Effects of Invention

According to the present disclosure, a thermal transfer sheet with which a printed material having an excellent brightness and enhanced durability and image visibility can be produced and which has enhanced transferability and a combination of the thermal transfer sheet and an intermediate transfer medium can be provided.

DESCRIPTION OF EMBODIMENTS

[Thermal Transfer Sheet]

Figure 1:
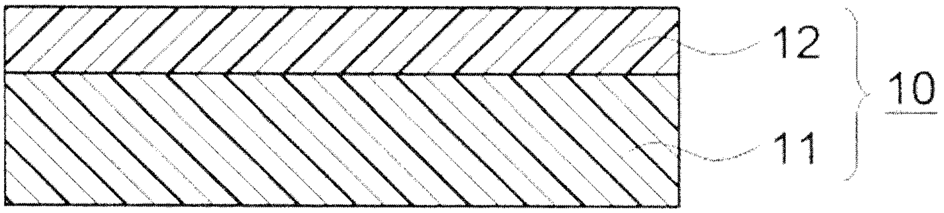
FIG. 1 is a schematic cross-sectional view of a thermal transfer sheet according to an embodiment of the present disclosure.

A thermal transfer sheet according to the present disclosure includes a substrate and a transfer layer. The transfer layer contains a luster pigment. This enhances the brightness of the printed material.

In the thermal transfer sheet according to the present disclosure, the ratio of the total area of black portions to the total area of white portions is 0.03 or more and 0.5 or less. The above total areas are calculated in the following manner. An image of the thermal transfer sheet is taken from a side on which the transfer layer is present using an optical microscope at a 500-fold magnification in order to obtain an 8-bit grayscale image. The image is analyzed with image analysis software. Dark and light portions of the analyzed image are inverted. Automatic thresholding is then performed by an ISODATA method in order to determine a threshold value of a brightness distribution of the analyzed image. Binary representation is subsequently performed such that portions in which brightness is less than the threshold value are colored in black and portions in which brightness is equal to or more than the threshold value are colored in white. The number and the total area of the black portions and the total area of the white portions are calculated.

Limiting the above ratio to 0.03 or more enhances the brightness of the printed material.

Limiting the above ratio to 0.5 or less enhances the durability and image visibility of the printed material and the transferability of the thermal transfer sheet.

The above ratio is preferably 0.05 or more and 0.3 or less and is more preferably 0.07 or more and 0.2 or less.

When the number of the black portions is counted, a completely independent black portion is considered as one black portion; for example, a black portion consisting of two circular black portions joined to each other to form an aggregate is considered as one black portion.

In the thermal transfer sheet according to the present disclosure, the average area of the black portions is 100 $\mu m^2$ or more and 300 $\mu m^2$ or less. The above average area is calculated in the following manner. An image of the thermal transfer sheet is taken from a side on which the transfer layer is present using an optical microscope at a 500-fold magnification in order to obtain an 8-bit grayscale image. The image is analyzed with image analysis software. Dark and light portions of the analyzed image are inverted. Automatic thresholding is then performed by an ISODATA method in order to determine a threshold value of a brightness distribution of the analyzed image. Binary representation is subsequently performed such that portions in which brightness is less than the threshold value are colored in black and portions in which brightness is equal to or more than the threshold value are colored in white. The number and the total area of the black portions and the total area of the white portions are calculated. The average area of the black portions is the quotient of the total area of the black portions divided by the number of the black portions.

Limiting the average area of the black portions to 100 $\mu m^2$ or more enhances the brightness of the printed material.

Limiting the average area of the black portions to 300 $\mu m^2$ or less enhances the durability and image visibility of the printed material and the transferability of the thermal transfer sheet.

The average area of the black portions is preferably 100 $\mu m^2$ or more and 200 $\mu m^2$ or less and is more preferably 110 $\mu m^2$ or more and 155 $\mu m^2$ or less.

The black portions obtained by the binary representation of the image may be derived from the luster pigment. The white portions obtained by the binary representation of the image may be derived from the resin material described below.

In the present disclosure, the optical microscope is, for example, "Digital Microscope VHX-500" produced by Keyence Corporation. In the present disclosure, the image analysis software is, for example, "Image J". In the present disclosure, the ISODATA method is a method in which a threshold value is automatically determined using the brightness distribution of the analyzed image. Automatic thresholding by the ISODATA method can be performed by a method known in the related art.

The reasons for which, in thermal transfer sheet according to the present disclosure, limiting the above ratio to 0.03 or more and 0.5 or less and limiting the average area of the black portions to 100 $\mu m^2$ or more and 300 $\mu m^2$ or less enable the production of a printed material having an excellent brightness and enhanced durability and image visibility and enhances the transferability of the thermal transfer sheet are described below.

Since the transfer layer of the thermal transfer sheet according to the present disclosure contains a luster pigment, the black portions of the image that has been converted into a binary representation are generally derived from the luster pigment, while the white portions are generally derived from a resin material.

Limiting the above ratio to 0.03 or more enables the content of the luster pigment in the printed material to be maintained. This enables the production of a printed material having excellent brightness. Limiting the above ratio to 0.5 or less enables the content of a resin material in the luster pigment-containing layer included in the printed material to be maintained. This enables the production of a printed material having excellent durability. Limiting the above ratio to 0.5 or less reduces the likelihood of the image being interrupted by an excessive amount of luster pigment. This enables the production of a printed material having excellent image visibility. Limiting the above ratio to 0.5 or less enables the content of a resin material in the transfer layer to be maintained. This reduces the degradation of the transferability of the thermal transfer sheet which may be caused by an excessive amount of luster pigment.

Limiting the average area of the black portions to 100 $\mu m^2$ or more enables the size of particles of the luster pigment to be maintained and allows the luster pigment to enhance brightness in a suitable manner. This enables the production of a printed material having excellent brightness. Limiting the average area of the black portions to 300 $\mu m^2$ or less reduces the portions of the printed material in which the resin material is sparsely scattered. In other words, the resin material can be uniformly dispersed in the luster pigment-containing layer included in the printed material. This enables the production of a printed material having excellent durability. Limiting the average area of the black portions to 300 $\mu m^2$ or less reduces the likelihood of the image being interrupted by an excessive amount of luster pigment. This enables the production of a printed material having excellent image visibility. Limiting the average area of the black portions to 300 $\mu m^2$ or less reduces the portions of the transfer layer in which the resin material is sparsely scattered. In other words, the resin material can be uniformly dispersed in the transfer layer. This reduces the degradation of the transferability of the thermal transfer sheet.

The thermal transfer sheet according to the present disclosure is described with reference to the attached drawings below.

In one embodiment, a thermal transfer sheet 10 includes a substrate 11 and a transfer layer 12 as illustrated in FIG. 1. The transfer layer 12 is disposed on one of the surfaces of the substrate 11 as illustrated in FIG. 1.

Figure 2:
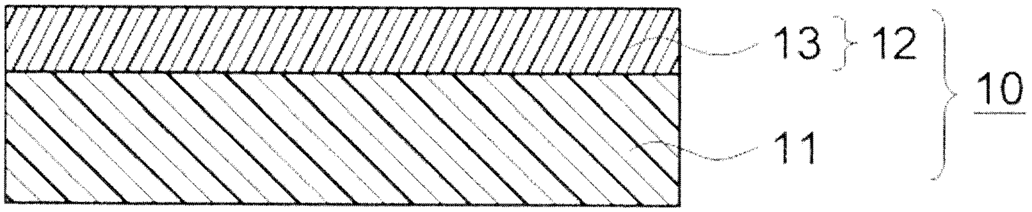
FIG. 2 is a schematic cross-sectional view of a thermal transfer sheet according to an embodiment of the present disclosure.

In one embodiment, as illustrated in FIG. 2, a thermal transfer sheet 10 includes a substrate 11 and a transfer layer 12, and the transfer layer 12 includes an adhesive layer 13. The transfer layer 12 is disposed on one of the surfaces of the substrate 11 as illustrated in FIG. 2. As described below, a receiving layer may be formed instead of the adhesive layer 13, and the transfer layer 12 may be a retransfer layer.

Figure 3:
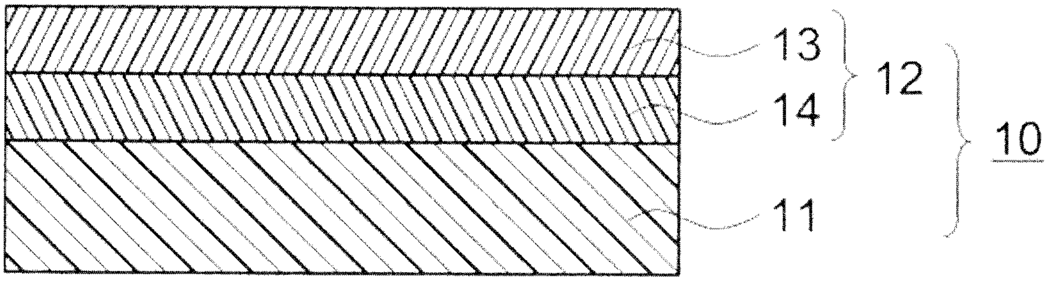
FIG. 3 is a schematic cross-sectional view of a thermal transfer sheet according to an embodiment of the present disclosure.

In one embodiment, as illustrated in FIG. 3, a thermal transfer sheet 10 includes a substrate 11 and a transfer layer 12, and the transfer layer 12 includes an adhesive layer 13 and a peeling layer 14. The transfer layer 12 is disposed on one of the surfaces of the substrate 11 as illustrated in FIG. 3. The peeling layer 14 is interposed between the substrate 11 and the adhesive layer 13 as illustrated in FIG. 3. As described below, a receiving layer may be formed instead of the adhesive layer 13, and the transfer layer 12 may be a retransfer layer.

Figure 4:
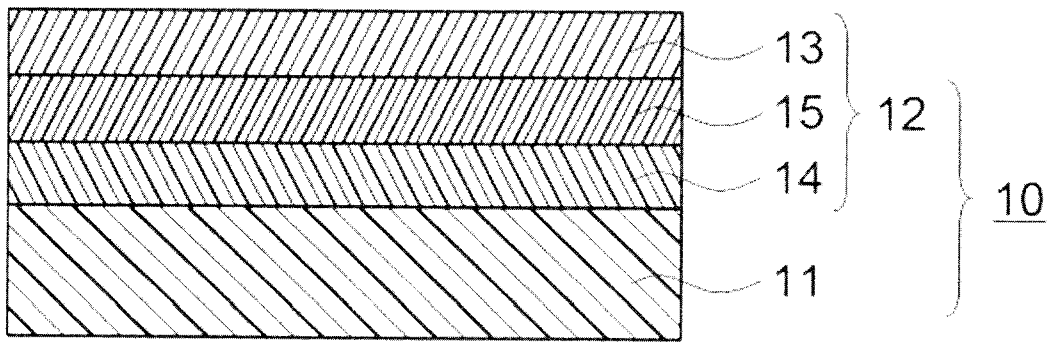
FIG. 4 is a schematic cross-sectional view of a thermal transfer sheet according to an embodiment of the present disclosure.

In one embodiment, as illustrated in FIG. 4, a thermal transfer sheet 10 includes a substrate 11 and a transfer layer 12, and the transfer layer 12 includes an adhesive layer 13, an intermediate layer 15, and a peeling layer 14. The transfer layer 12 is disposed on one of the surfaces of the substrate 11 as illustrated in FIG. 4. The peeling layer 14 is interposed between the substrate 11 and the adhesive layer 13 as illustrated in FIG. 4. The intermediate layer 15 is interposed between the peeling layer 14 and the adhesive layer 13 as illustrated in FIG. 4. As described below, a receiving layer may be formed instead of the adhesive layer 13, the intermediate layer 15 may be a protective layer, and the transfer layer 12 may be a retransfer layer.

The thermal transfer sheet 10 may include a colorant layer (not illustrated in the drawing) such that the colorant layer and the transfer layer 12 are arranged in a frame sequential manner. As a colorant layer, a plurality of colorant layers may be arranged in a frame sequential manner (not illustrated in the drawing).

The thermal transfer sheet 10 may optionally include a primer layer (not illustrated in the drawing) interposed between the substrate 11 and the colorant layer.

The thermal transfer sheet 10 may optionally include a peeling layer (not illustrated in the drawing) interposed between the substrate 11 and the colorant layer.

The thermal transfer sheet 10 may optionally include a release layer (not illustrated in the drawing) interposed between the substrate 11 and at least one layer selected from the transfer layer 12, the colorant layer, and the peeling layer.

The thermal transfer sheet 10 may optionally include a back layer (not illustrated in the drawing) disposed on a side of the substrate 11 which is opposite to the side on which the transfer layer 12 is disposed.

The combination of layers constituting the thermal transfer sheet 10 can be changed as needed.

Each of the layers that may be included in the thermal transfer sheet according to the present disclosure is described below.

<Substrate>

The substrate of the thermal transfer sheet preferably has heat resistance to thermal energy applied during the thermal transfer, a mechanical strength with which the substrate supports the layers disposed on and above the substrate, and resistance to solvents.

The substrate of the thermal transfer sheet can be a film composed of a resin material (hereinafter, such a film is referred to simply as "resin film"). Examples of the resin material include polyesters, such as polyethylene terephthalate (PET), polybutylene terephthalate (PBT), polyethylene naphthalate (PEN), 1,4-polycyclohexylenedimethylene terephthalate, and a terephthalic acid-cyclohexanedimethanol-ethylene glycol copolymer; polyamides, such as nylon 6 and nylon 6,6; polyolefins, such as polyethylene (PE), polypropylene (PP), and polymethylpentene; vinyl resins, such as polyvinyl chloride, polyvinyl alcohol (PVA), polyvinyl acetate, a vinyl chloride-vinyl acetate copolymer, polyvinyl butyral, and polyvinylpyrrolidone (PVP); (meth)acrylic resins, such as polyacrylate, polymethacrylate, and polymethyl methacrylate; imide resins, such as polyimide and polyetherimide; cellulose resins, such as cellophane, cellulose acetate, nitrocellulose, cellulose acetate propionate (CAP), and cellulose acetate butyrate (CAB); styrene resins, such as polystyrene (PS); polycarbonates; and ionomer resins.

Among the above resins, polyesters, such as PET and PEN, are preferable and PET is particularly preferable in consideration of heat resistance and mechanical strength.

In the present disclosure, the term "(meth)acryl" refers to both "acryl" and "methacryl", and the term "(meth)acrylate" refers to both "acrylate" and "methacrylate".

A multilayer body of the above resin films can also be used as a substrate. The multilayer body of resin films can be prepared by dry lamination, wet lamination, extrusion, or the like.

In the case where the substrate of the thermal transfer sheet is a resin film, the resin film may be either a stretched or unstretched film. In consideration of strength, a uniaxially or biaxially stretched film is preferable.

The thickness of the substrate of the thermal transfer sheet is preferably 2 μm or more and 25 μm or less and is preferably 3 μm or more and 16 μm or less. In such a case, the mechanical strength of the substrate is increased and the transfer of thermal energy during thermal transfer can be facilitated.

<Transfer Layer>

The transfer layer is a layer that is to be transferred from the thermal transfer sheet to an intermediate transfer medium, a transfer-receiving article, or the like upon being heated.

The transfer layer is a layer containing a luster pigment. This enhances the brightness of the printed material.

The transfer layer may include an adhesive layer. In such a case, the adhesion of the transfer layer can be enhanced.

The transfer layer may further include a peeling layer. In such a case, the transferability of the thermal transfer sheet can be enhanced.

The transfer layer may further include an intermediate layer. In such a case, the interlayer adhesion of the transfer layer can be enhanced.

In one embodiment, the transfer layer may include a receiving layer that serves as a surface layer (uppermost surface layer). In such a case, an image can be readily formed on the thermal transfer sheet. In this embodiment, the thermal transfer sheet is an "intermediate transfer medium" and the transfer layer is a retransfer layer.

The transfer layer including the receiving layer may further include a peeling layer. In such a case, the transferability of the thermal transfer sheet can be enhanced. The peeling layer may be interposed between the substrate and the receiving layer.

The transfer layer including the receiving layer may further include a protective layer. In such a case, the durability of the printed material can be enhanced. The protective layer may be interposed between the substrate and the receiving layer.

The transfer layer including the receiving layer may further include the peeling layer and the protective layer. In such a case, the durability of the printed material can be enhanced. The peeling layer and the protective layer may be interposed between the substrate and the receiving layer.

In one embodiment, in the thermal transfer sheet according to the present disclosure, one or more layers selected from the peeling layer, the intermediate layer, and the adhesive layer contain a luster pigment. In the thermal transfer sheet according to the present disclosure, the adhesive layer preferably contains a luster pigment.

In one embodiment, in the thermal transfer sheet according to the present disclosure, one or more layers selected from the peeling layer, the protective layer, and the receiving layer contain a luster pigment.

Examples of the luster pigment include a metal pigment and a coated pigment. A coated pigment is preferable. In the present disclosure, the term "coated pigment" refers to particles each constituted by a core and a covering material, such as a metal or a metal oxide, which covers the core.

The transfer layer may contain two or more types of luster pigments.

Examples of the metal pigment include particles composed of aluminum, iron, titanium, zirconium, silicon, cerium, nickel, chromium, brass, tin, brass, bronze, zinc, silver, platinum, gold, and oxides of the above metals.

The material constituting the core of the coated pigment may be either an inorganic or organic material.

Examples of the inorganic material include natural mica, synthetic mica, glass, aluminum, and alumina.

Examples of the organic material include resin materials, such as polyester, polyamide, polyolefin, a vinyl resin, and a (meth)acrylic resin.

The core preferably contains glass and is more preferably composed of glass. In such a case, negative impacts to the tint of the covering material are reduced and the brightness of the printed material can be further enhanced.

Examples of the covering material include aluminum, iron, titanium, zirconium, silicon, cerium, nickel, chromium, brass, tin, brass, bronze, zinc, silver, platinum, gold, and oxides of the above metals. The covering material is preferably a metal in consideration of the brightness of the printed material.

The covering material preferably contains gold or silver and is more preferably composed of gold or silver. In such a case, the brightness of the printed material can be further enhanced.

The coated pigment is preferably composed of particles produced by covering glass particles with a metal and is particularly preferably composed of particles produced by covering glass particles with gold or silver. When the coated pigment particles are particles composed of glass and a metal, negative impacts to the tint of the covering material are reduced and the brightness of the printed material can be further enhanced.

The shape of particles of the luster pigment is not limited and may be, for example, spherical, acicular, or scale-like. Among these, a scale-like shape is preferable in consideration of brightness.

The average particle size of the luster pigment is preferably 1 μm or more and 100 μm or less and is more preferably 7 μm or more and 40 μm or less. In such a case, the brightness, durability, and image visibility of the printed material can be further enhanced and the transferability of the thermal transfer sheet can be further enhanced.

The average particle size of the luster pigment can be measured by a laser diffraction/scattering method. The size of scale-like particles is the light scattering equivalent diameter determined when the scale-like particles are analyzed by a laser diffraction/scattering method. A light scattering equivalent diameter is defined as the diameter of a sphere that has a scatter pattern closest to the light scatter pattern of the particles analyzed and that has the same refractive index as the particles.

The thickness of particles of the luster pigment is preferably 0.5 μm or more and 10 μm or less. In such a case, the brightness, durability, and image visibility of the printed material can be further enhanced, and the transferability of the thermal transfer sheet can be further enhanced.

The thickness of particles of the luster pigment can be determined by selecting a predetermined number (preferably, 100 or more) of scale-like particles from the particles that are to be analyzed and measuring the thicknesses of the selected scale-like particles with an electron microscope.

The cover of the core can be formed by vapor deposition or the like. Alternatively, a commercial coated pigment may also be used.

(Adhesive Layer)

The adhesive layer is a layer that is to be transferred from the thermal transfer sheet to an intermediate transfer medium or the like upon being heated.

The adhesive layer contains at least one type of thermoplastic resin that becomes softened and produces adhesion upon being heated. Examples of the thermoplastic resin include polyester, a vinyl resin, a (meth)acrylic resin, polyurethane, a cellulose resin, polyamide, polyolefin, polystyrene, and resins produced by chlorinating the above resins.

In one embodiment, the adhesive layer contains the above luster pigment. This enhances the brightness of the printed material. The adhesive layer may contain two or more types of the luster pigments.

In the case where the adhesive layer contains the luster pigment, a PV ratio of the luster pigment (P) to the resin material (V) contained in the adhesive layer, such as a thermoplastic resin, is preferably 0.1 or more and 2 or less, and is more preferably 0.2 or more and 1 or less. In such a case, the brightness, durability, and image visibility of the printed material can be further enhanced, and the transferability of the thermal transfer sheet can be further enhanced.

The adhesive layer may contain an additive. Examples of the additive include a colorant, an ultraviolet absorber, a plasticizer, an antitarnish agent, a surfactant, a delusterant, a deodorizer, a flame retardant, a weathering agent, a yarn friction reducer, a slipping agent, an antioxidant, an ion exchanger, and a dispersant.

The thickness of the adhesive layer is, for example, 0.1 μm or more and 3 μm or less. In the present disclosure, the thickness of each layer is, in the case where the layer contains a luster pigment, the average thickness of portions of the layer in which the luster pigment is absent.

The adhesive layer can be formed by dispersing or dissolving the above materials in water or an appropriate solvent to prepare a coating liquid, applying the coating liquid to the substrate, the peeling layer, the release layer, or the like by publicly known means, such as roll coating, reverse roll coating, gravure coating, reverse gravure coating, bar coating, or rod coating, to form a coating film, and drying the coating film.

The average area of the black portions can be adjusted by, for example, changing the amount of time during which the dispersion treatment of the coating liquid used for forming the layer containing the luster pigment is performed. For example, the larger the amount of time during which the dispersion treatment is performed, the smaller the average area of the black portions tends to be.

(Peeling Layer)

The peeling layer is a layer that is to be transferred from the thermal transfer sheet to an intermediate transfer medium, a transfer-receiving article, or the like upon being heated.

The peeling layer contains at least one type of a resin material. Examples of the resin material contained in the peeling layer include polyester, polyamide, polyolefin, a vinyl resin, a (meth)acrylic resin, an imide resin, a cellulose resin, a styrene resin, polycarbonate, and an ionomer resin. The peeling layer preferably contains a (meth)acrylic resin and more preferably contains polymethyl methacrylate in consideration of transferability.

In one embodiment, the peeling layer contains the luster pigment. This enhances the brightness of the printed material. The peeling layer may contain two or more types of the luster pigments.

In the case where the peeling layer contains the luster pigment, the ratio (PV ratio) of the luster pigment to the resin material contained in the peeling layer, such as a thermoplastic resin, is preferably 0.1 or more and 2 or less and is more preferably 0.2 or more and 1 or less. In such a case, the brightness, durability, and image visibility of the printed material can be further enhanced, and the transferability of the thermal transfer sheet can be further enhanced.

The peeling layer may contain at least one type of a release agent. Examples of the release agent include a fluorine compound, a phosphate ester compound, a silicone oil, a higher fatty acid amide, and a wax, such as a metal soap or a paraffin wax.

The peeling layer may contain the above additives.

The thickness of the peeling layer is, for example, 0.1 μm or more and 3 μm or less.

The peeling layer can be formed by dispersing or dissolving the above materials in an appropriate solvent to prepare a coating liquid, applying the coating liquid to the substrate, the release layer, or the like by the above-described coating means to form a coating film, and drying the coating film.

The peeling layer may be interposed between the substrate and the colorant layer.

(Intermediate Layer)

The intermediate layer is a layer that is to be transferred from the thermal transfer sheet to an intermediate transfer medium or the like upon being heated.

The intermediate layer contains at least one type of a resin material. Examples of the resin material include polyolefin, a vinyl resin, a (meth)acrylic resin, a cellulose resin, polyester, polyamide, polycarbonate, polystyrene, a urethane resin, and an ionomer resin.

In one embodiment, the intermediate layer contains the luster pigment. This enhances the brightness of the printed material. The intermediate layer may contain two or more types of the luster pigments.

In the case where the intermediate layer contains the luster pigment, the ratio (PV ratio) of the luster pigment to the resin material contained in the intermediate layer, such as a thermoplastic resin, is preferably 0.1 or more and 2 or less and is more preferably 0.2 or more and 1 or less. In such a case, the brightness, durability, and image visibility of the printed material can be further enhanced, and the transferability of the thermal transfer sheet can be further enhanced.

The intermediate layer may contain the above additives.

The thickness of the intermediate layer is, for example, 0.1 μm or more and 3 μm or less.

The intermediate layer can be formed by dispersing or dissolving the above materials in an appropriate solvent to prepare a coating liquid, applying the coating liquid to the peeling layer or the like by the above-described coating means to form a coating film, and drying the coating film.

(Receiving Layer)

The receiving layer is a layer that is to be transferred from the thermal transfer sheet to a transfer-receiving article or the like upon being heated.

The receiving layer contains at least one type of a resin material. Examples of the resin material contained in the receiving layer include polyolefin, a vinyl resin, such as polyvinyl chloride, or a vinyl chloride-vinyl acetate copolymer, a (meth)acrylic resin, a cellulose resin, polyester, polyamide, polycarbonate, a styrene resin, an epoxy resin, polyurethane, and an ionomer resin.

The content of the resin material in the receiving layer is preferably 80% by mass or more and 99.5% by mass or less and is further preferably 85% by mass or more and 99% by mass or less.

In one embodiment, the receiving layer contains the luster pigment. This enhances the brightness of the printed material. The receiving layer may contain two or more types of the luster pigments.

In the case where the receiving layer contains the luster pigment, the ratio (PV ratio) of the luster pigment to the resin material contained in the receiving layer is preferably 0.1 or more and 2 or less and is more preferably 0.2 or more and 1 or less. In such a case, the brightness, durability, and image visibility of the printed material can be further enhanced, and the transferability of the thermal transfer sheet can be further enhanced.

The receiving layer may contain the above additives.

The thickness of the receiving layer is preferably 0.5 μm or more and 20 μm or less and is more preferably 1 μm or more and 10 μm or less.

The receiving layer can be formed by dispersing or dissolving the above materials in an appropriate solvent to prepare a coating liquid, applying the coating liquid to the substrate, the release layer, the peeling layer, the protective layer, or the like by the above-described coating means to form a coating film, and drying the coating film.

(Protective Layer)

The protective layer is a layer that is to be transferred from the thermal transfer sheet to a transfer-receiving article or the like upon being heated.

The protective layer contains at least one type of a resin material. Examples of the resin material contained in the protective layer include polyester, a (meth)acrylic resin, an epoxy resin, a styrene resin, a (meth)acrylic polyol resin, polyurethane, an ionizing radiation curable resin, and an ultraviolet absorbing resin.

In one embodiment, the protective layer contains the luster pigment. This enhances the brightness of the printed material. The protective layer may contain two or more types of the luster pigments.

In the case where the protective layer contains the luster pigment, the ratio (PV ratio) of the luster pigment to the resin material contained in the protective layer is preferably 0.1 or more and 2 or less and is more preferably 0.2 or more and 1 or less. In such a case, the brightness, durability, and image visibility of the printed material can be further enhanced, and the transferability of the thermal transfer sheet can be further enhanced.

The protective layer may contain the above additives.

The thickness of the protective layer is preferably 0.5 μm or more and 7 μm or less and is more preferably 1 μm or more and 5 μm or less. In such a case, the durability of the protective layer can be further enhanced.

The protective layer can be formed by dispersing or dissolving the above materials in an appropriate solvent to prepare a coating liquid, applying the coating liquid to the substrate, the release layer, the peeling layer, or the like by the above-described coating means to form a coating film, and drying the coating film.

<Colorant Layer>

The colorant layer is a layer used for forming an image. The colorant layer contains at least one type of a colorant. The colorant layer may be either a sublimation transfer-type colorant layer from which a sublimation colorant contained in the colorant layer, such as a sublimation dye, is to be transferred or a melt transfer-type colorant layer from which the colorant layer itself is to be transferred. The thermal transfer sheet according to the present disclosure may include both sublimation transfer-type colorant layer and melt transfer-type colorant layer.

The colorant contained in the colorant layer may be either a pigment or dye.

The dye may be a sublimation dye.

Examples of the pigment include carbon black, acetylene black, lamp black, black smoke, iron black, aniline black, silica, calcium carbonate, titanium oxide, cadmium red, cadmopone red, chrome red, vermilion, iron oxide red, an azo pigment, alizarin lake, quinacridone, cochineal lake perylene, yellow ocher, aureolin, cadmium yellow, cadmium orange, chrome yellow, zinc yellow, naples yellow, nickel yellow, an azo pigment, greenish yellow, ultramarine, mountain blue, cobalt, phthalocyanine, anthraquinone, indigoid, cinnabar green, cadmium green, chrome green, phthalocyanine, azomethine, perylene, and an aluminum pigment.

Examples of the dye include a diarylmethane dye, a triarylmethane dye, a thiazole dye, a merocyanine dye, a pyrazolone dye, a methine dye, an indoaniline dye, an acetophenone azomethine dye, a pyrazolo azomethine dye, a xanthene dye, an oxazine dye, a thiazine dye, an azine dye, an acridine dye, an azo dye, a spiropyran dye, an indolinospiropyran dye, a fluoran dye, a naphthoquinone dye, an anthraquinone dye, and a quinophthalone dye.

The colorant layer contains at least one type of a resin material. Examples of the resin material contained in the colorant layer include polyester, polyamide, polyolefin, a vinyl resin, a (meth)acrylic resin, a cellulose resin, a styrene resin, polycarbonate, a phenoxy resin, an ionomer resin, and an acetal resin.

The colorant layer may contain the above additives.

The thickness of the colorant layer is, for example, 0.1 μm or more and 3 μm or less.

The colorant layer can be formed by dispersing or dissolving the above materials in an appropriate solvent to prepare a coating liquid, applying the coating liquid to the substrate, the peeling layer, the primer layer, the release layer, or the like by the above-described coating means to form a coating film, and drying the coating film.

<Primer Layer>

The primer layer is a layer that remains on the substrate when thermal transfer is performed using the thermal transfer sheet. When the thermal transfer sheet includes the primer layer, the adhesion between the substrate and the colorant layer can be increased.

The primer layer contains at least one type of a resin material. Examples of the resin material contained in the primer layer include polyester, a vinyl resin, polyurethane, a (meth)acrylic resin, polyamide, polyether, a styrene resin, and a cellulose resin.

The primer layer may contain the above additives.

The thickness of the primer layer is, for example, 0.05 μm or more and 2.0 μm or less.

The primer layer can be formed by dispersing or dissolving the above materials in an appropriate solvent to prepare a coating liquid, applying the coating liquid to the substrate or the like by the above-described coating means to form a coating film, and drying the coating film.

<Release Layer>

The release layer is a layer that remains on the substrate when thermal transfer is performed using the thermal transfer sheet. When the thermal transfer sheet includes the release layer, transferability can be enhanced.

The release layer contains at least one type of a resin material. Examples of the resin material contained in the release layer include a (meth)acrylic resin, polyurethane, an acetal resin, polyamide, polyester, a melamine resin, a polyol resin, a cellulose resin, and a silicone resin.

The release layer may contain at least one type of a release agent. Examples of the release agent include a fluorine compound, a phosphate ester compound, a silicone oil, a higher fatty acid amide, and a wax, such as a metal soap or a paraffin wax.

The content of the release agent in the release layer is preferably 0.1% by mass or more and 10% by mass or less and is more preferably 0.5% by mass or more and 5% by mass or less. In such a case, the transferability of the thermal transfer sheet can be further enhanced.

The release layer may contain the above additives.

The thickness of the release layer is, for example, 0.1 μm or more and 2.0 μm or less.

The release layer can be formed by dispersing or dissolving the above materials in an appropriate solvent to prepare a coating liquid, applying the coating liquid to the substrate or the like by the above-described coating means to form a coating film, and drying the coating film.

<Back Layer>

The back layer is a layer disposed on a side of the substrate which is opposite to the side on which the transfer layer is present. When the thermal transfer sheet includes the back layer, the likelihood of sticking and wrinkling being caused by heating during the thermal transfer can be reduced.

The back layer may contain at least one type of a resin material. Examples of the resin material contained in the back layer include a vinyl resin, polyester, polyamide, polyolefin, a (meth)acrylic resin, polyolefin, polyurethane, a cellulose resin, and a phenolic resin.

The back layer may contain at least one type of an isocyanate compound. Examples of the isocyanate composition contained in the back layer include xylene diisocyanate, toluene diisocyanate, isophorone diisocyanate, and hexamethylene diisocyanate.

The back layer may contain the above additives.

The thickness of the back layer is, for example, 0.01 μm or more and 3.0 μm or less.

The back layer can be formed by dispersing or dissolving the above materials in an appropriate solvent to prepare a coating liquid, applying the coating liquid to the substrate by the above-described coating means to form a coating film, and drying the coating film.

[Combination of Thermal Transfer Sheet and Intermediate Transfer Medium]

A combination of a thermal transfer sheet and an intermediate transfer medium according to the present disclosure is a combination of the thermal transfer sheet according to the present disclosure and an intermediate transfer medium.

In the combination of the thermal transfer sheet according to the present disclosure and an intermediate transfer medium, the “substrate”, “peeling layer”, and “release layer” included in the thermal transfer sheet may be referred to as “first substrate”, “first peeling layer”, and “first release layer”, respectively, and the “substrate”, “peeling layer”, and “release layer” included in the intermediate transfer medium may be referred to as “second substrate”, “second peeling layer”, and “second release layer”, respectively.

The combination according to the present disclosure is described below with reference to the attached drawings.

Figure 5:
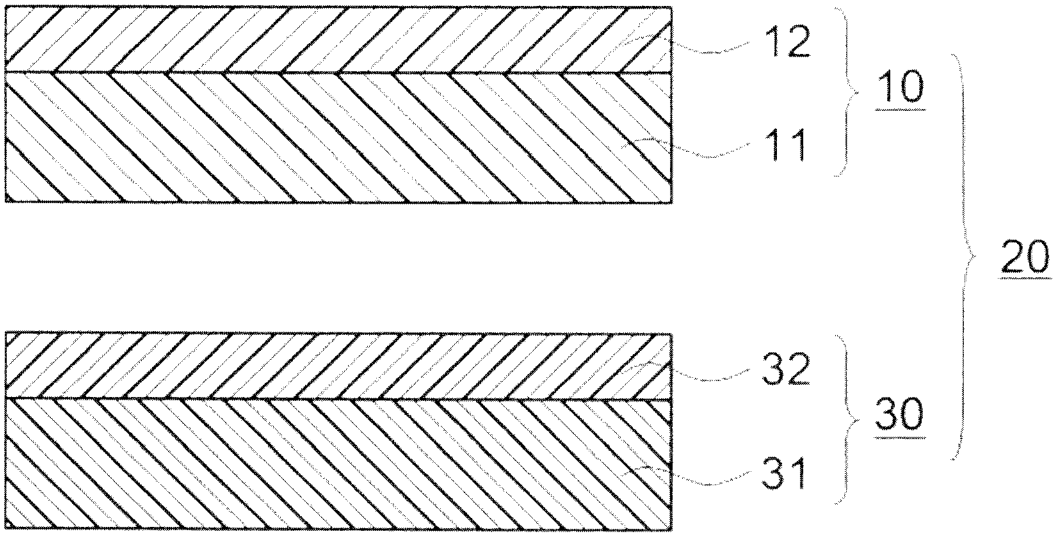
FIG. 5 is a schematic cross-sectional view of a combination of the thermal transfer sheet and an intermediate transfer medium according to an embodiment of the present disclosure.

In one embodiment, a combination 20 of a thermal transfer sheet and an intermediate transfer medium includes a thermal transfer sheet 10 that includes a substrate 11 and a transfer layer 12 and an intermediate transfer medium 30 that includes a second substrate 31 and a retransfer layer 32, as illustrated in FIG. 5. The transfer layer 12 is disposed on one of the surfaces of the substrate 11 as illustrated in FIG. 5. The retransfer layer 32 is disposed on one of the surfaces of the second substrate 31 as illustrated in FIG. 5.

The retransfer layer 32 of the intermediate transfer medium 30 may optionally include a receiving layer (not illustrated in the drawing).

The retransfer layer 32 of the intermediate transfer medium 30 may optionally include a second peeling layer and a receiving layer, and the second peeling layer may be interposed between the second substrate 31 and the receiving layer (not illustrated in the drawing).

The retransfer layer 32 of the intermediate transfer medium 30 may optionally include a protective layer and a receiving layer, and the protective layer may be interposed between the second substrate 31 and the receiving layer (not illustrated in the drawing).

The retransfer layer 32 of the intermediate transfer medium 30 may optionally include a second peeling layer, a protective layer, and a receiving layer in this order, and the second peeling layer and the protective layer may be interposed between the second substrate 31 and the receiving layer (not illustrated in the drawing).

The intermediate transfer medium 30 may include a second release layer interposed between the second substrate 31 and the retransfer layer 32 (not illustrated in the drawing).

The combination of layers constituting the combination 20 can be changed as needed.

Each of the layers that may be included in the intermediate transfer medium, which constitutes the combination according to the present disclosure, is described below. The description of the thermal transfer sheet constituting the combination according to the present disclosure, which is described above, is omitted below.

<Second Substrate>

The second substrate preferably has heat resistance to thermal energy applied when thermal transfer is performed using the intermediate transfer medium, a mechanical strength with which the second substrate supports the retransfer layer, etc. disposed on and above the second substrate, and resistance to solvents.

The material constituting the second substrate may be selected appropriately from the materials that can be used for producing the first substrate.

The thickness of the second substrate is, for example, 1 μm or more and 50 μm or less.

<Retransfer Layer>

The retransfer layer is a layer that is to be transferred from the intermediate transfer medium to a transfer-receiving article or the like.

The retransfer layer may include a receiving layer. In such a case, an image can be readily formed on the intermediate transfer medium. In one embodiment, the receiving layer serves as a surface layer of the retransfer layer.

The retransfer layer may include a second peeling layer. In such a case, the transferability of the intermediate transfer medium can be enhanced.

The retransfer layer may include a protective layer. In such a case, the durability of the printed material can be enhanced.

(Receiving Layer)

The receiving layer is a layer that is to be transferred from the intermediate transfer medium to a transfer-receiving article or the like.

The receiving layer contains at least one type of a resin material. Examples of the resin material contained in the receiving layer include polyolefin, a vinyl resin, such as polyvinyl chloride, or a vinyl chloride-vinyl acetate copolymer, a (meth)acrylic resin, a cellulose resin, polyester, polyamide, polycarbonate, a styrene resin, an epoxy resin, polyurethane, and an ionomer resin.

The content of the resin material in the receiving layer is preferably 80% by mass or more and 99.5% by mass or less and is further preferably 85% by mass or more and 99% by mass or less.

The receiving layer may contain the above additives.

The thickness of the receiving layer is preferably 0.5 μm or more and 20 μm or less and is more preferably 1 μm or more and 10 μm or less.

The receiving layer can be formed by dispersing or dissolving the above materials in an appropriate solvent to prepare a coating liquid, applying the coating liquid to the second substrate, the second release layer, the second peeling layer, the protective layer, or the like by the above-described coating means to form a coating film, and drying the coating film.

(Second Peeling Layer)

The second peeling layer is a layer that is to be transferred from the intermediate transfer medium to a transfer-receiving article or the like.

The second peeling layer contains at least one type of a resin material. Examples of the resin material contained in the peeling layer include polyester, polyamide, polyolefin, a vinyl resin, a (meth)acrylic resin, an imide resin, a cellulose resin, a styrene resin, polycarbonate, and an ionomer resin.

The second peeling layer may contain the above release agents and the above additives.

The thickness of the second peeling layer is, for example, 0.1 μm or more and 3 μm or less.

The second peeling layer can be formed by dispersing or dissolving the above materials in an appropriate solvent to prepare a coating liquid, applying the coating liquid to the second substrate or the like by the above-described coating means to form a coating film, and drying the coating film.

(Protective Layer)

The protective layer is a layer that is to be transferred from the intermediate transfer medium to a transfer-receiving article or the like.

The protective layer contains at least one type of a resin material. Examples of the resin material contained in the protective layer include polyester, a (meth)acrylic resin, an epoxy resin, a styrene resin, a (meth)acrylic polyol resin, polyurethane, an ionizing radiation curable resin, and an ultraviolet absorbing resin.

The protective layer may contain the above additives.

The thickness of the protective layer is preferably 0.5 μm or more and 7 μm or less and is more preferably 1 μm or more and 5 μm or less. In such a case, the durability of the protective layer can be further enhanced.

The protective layer can be formed by dispersing or dissolving the above materials in an appropriate solvent to prepare a coating liquid, applying the coating liquid to the second substrate, the second release layer, the second peeling layer, or the like by the above-described coating means to form a coating film, and drying the coating film.

<Second Release Layer>

The second release layer is a layer that remains on the second substrate when thermal transfer is performed using the intermediate transfer medium. When the intermediate transfer medium includes the second release layer, the transferability of the intermediate transfer medium can be enhanced.

The second release layer of the intermediate transfer medium can be the release layer described above in the description of the thermal transfer sheet according to the present disclosure.

The second release layer can be formed by dispersing or dissolving the above materials in an appropriate solvent to prepare a coating liquid, applying the coating liquid to the second substrate or the like by the above-described coating means to form a coating film, and drying the coating film.

Thermal transfer sheets and a combination of a thermal transfer sheet and an intermediate transfer medium according to embodiments of the present disclosure are described below. Note that the thermal transfer sheet and the combination of a thermal transfer sheet and an intermediate transfer medium according to the present disclosure are not limited to the following embodiments.

The present disclosure is a thermal transfer sheet including a substrate and a transfer layer, the transfer layer containing a luster pigment, wherein, when an image of the thermal transfer sheet is taken from a side on which the transfer layer is present using an optical microscope at a 500-fold magnification in order to obtain an 8-bit grayscale image, the image is analyzed with image analysis software, dark and light portions of the analyzed image are inverted, automatic thresholding is then performed by an ISODATA method in order to determine a threshold value of a brightness distribution of the analyzed image, binary representation is subsequently performed such that portions in which brightness is less than the threshold value are colored in black and portions in which brightness is equal to or more than the threshold value are colored in white, and the number and the total area of the black portions and the total area of the white portions are calculated, a ratio of the total area of the black portions to the total area of the white portions is 0.03 or more and 0.5 or less, and the black portions have an average area of 100 $\mu m^2$ or more and 300 $\mu m^2$ or less.

In one embodiment, the luster pigment may be a coated pigment including a core and a covering material that covers the core.

In one embodiment, the core may contain glass, and the covering material may contain gold or silver.

In one embodiment, the transfer layer may include an adhesive layer.

In one embodiment, the transfer layer may further include a peeling layer, and the peeling layer may be interposed between the substrate and the adhesive layer.

In one embodiment, the transfer layer may further include an intermediate layer, the intermediate layer may be interposed between the peeling layer and the adhesive layer, and one or more layers selected from the peeling layer, the intermediate layer, and the adhesive layer may contain a luster pigment.

In one embodiment, the thermal transfer sheet may further include a colorant layer disposed on the substrate, wherein the colorant layer and the transfer layer may be arranged on the substrate in a frame sequential manner.

In one embodiment, the transfer layer may include a receiving layer that serves as a surface layer.

The present disclosure is a combination of the thermal transfer sheet and an intermediate transfer medium.

EXAMPLES

The present disclosure is described further in detail with reference to Examples below. The present disclosure is not limited to Examples below. Hereinafter, the content of a material described along with the solid content therein is the content of the material which has not been converted in terms of solid content.

Example 1

A PET film having a thickness of 4.5 μm (Lumirror (registered trademark) produced by Toray Industries, Inc.) was provided as a substrate (first substrate).

A back layer-forming coating liquid having the composition described below was applied onto one of the surfaces of the first substrate, and the resulting coating film was dried to form a back layer having a thickness of 0.1 μm.

Colorant layer-forming coating liquids A to D having the compositions described below were applied onto a part of the other surface of the first substrate, on which the back layer was absent, in a frame sequential manner, and the resulting coating films were dried to form colorant layers A to D, respectively, having a thickness of 0.7 μm.

Then, a peeling layer-forming coating liquid (first peeling layer-forming coating liquid) having the composition described below was applied in a frame sequential manner with respect to the colorant layers, and the resulting coating film was dried to form a peeling layer (first peeling layer) having a thickness of 0.8 μm.

An adhesive layer-forming coating liquid (containing a luster pigment) having the composition described below was applied to the first peeling layer with a coating tester GP-10 (produced by Kurabo Industries Ltd.) heliograph plate 54L, and the resulting coating film was dried at 100° C. for 1 minute to form an adhesive layer. Hereby, a thermal transfer sheet was produced. The first peeling layer and the adhesive layer constituted the transfer layer of the thermal transfer sheet. In the preparation of the adhesive layer-forming coating liquid, 50 g of the adhesive layer-forming coating liquid and 250 g of zirconia beads having a size of 0.5 mm were charged into a glass bottle. Subsequently, a dispersion treatment was performed for 10 minutes by shaking the bottle with a paint shaker (produced by ASADA Iron Works Co., Ltd.).

<Back Layer-Forming Coating Liquid>

| | |
|---|---|
| Polyvinyl butyral (S-LEC (registered trademark) BX-1 produced by Sekisui Chemical Co., Ltd.) | 2 parts by mass |
| Polyisocyanate (BURNOCK (registered trademark) D750 produced by DIC Corporation) | 9.2 parts by mass |
| Phosphate ester surfactant (PLYSURF (registered trademark) A208N produced by DKS Co., Ltd.) | 1.3 parts by mass |
| Talc (MICRO ACE (registered trademark) P-3 produced by Nippon Talc Co., Ltd.) | 0.3 parts by mass |
| Methyl ethyl ketone (MEK) | 43.6 parts by mass |
| Toluene | 43.6 parts by mass |

<Colorant Layer-Forming Coating Liquid A>

| | |
|---|---|
| Yellow sublimation dye | 5 parts by mass |
| Polyvinyl acetal | 5 parts by mass |
| MEK | 90 parts by mass |

<Colorant Layer-Forming Coating Liquid B>

| | |
|---|---|
| Magenta sublimation dye | 5 parts by mass |
| Polyvinyl acetal | 5 parts by mass |
| MEK | 90 parts by mass |

<Colorant Layer-Forming Coating Liquid C>

| | |
|---|---|
| Cyan sublimation dye | 5 parts by mass |
| Polyvinyl acetal | 5 parts by mass |
| MEK | 90 parts by mass |

<Colorant Layer-Forming Coating Liquid D>

| | |
|---|---|
| Carbon black | 5 parts by mass |
| Vinyl chloride-vinyl acetate copolymer | 5 parts by mass |
| MEK | 90 parts by mass |

<First Peeling Layer-Forming Coating Liquid>

| | |
|---|---|
| Vinyl chloride-vinyl acetate copolymer (SOLBIN (registered trademark) CNL produced by Nissin Chemical Co., Ltd.) | 18 parts by mass |
| Polyester (VYLON (registered trademark) 220 produced by Toyobo Co., Ltd.) | 1 part by mass |
| Epoxy modified silicone oil (KP-1800U produced by Shin-Etsu Chemical Co., Ltd.) | 1 part by mass |
| MEK | 40 parts by mass |
| Toluene | 40 parts by mass |

<Adhesive Layer-Forming Coating Liquid (Containing Luster Pigment)>

| | |
|---|---|
| Luster pigment A (METASHINE (registered trademark) 2025PS produced by Nippon Sheet Glass Co., Ltd., core: glass, covering material: silver, average particle size: 25 μm) | 3.9 parts by mass |
| Vinyl chloride-vinyl acetate copolymer (SOLBIN (registered trademark) CNL produced by Nissin Chemical Co., Ltd.) | 26.1 parts by mass |
| MEK | 35 parts by mass |
| Toluene | 35 parts by mass |

Examples 2 to 9 and Comparative Examples 1 to 4

A thermal transfer sheet was produced as in Example 1, except that the structure of the layers constituting the thermal transfer sheet was changed as described in Table 1. Details of the luster pigments listed in Table 1 are as follows.

Luster pigment B: METASHINE (registered trademark) 1030GP produced by Nippon Sheet Glass Co., Ltd., core: glass, covering material: gold, average particle size: 30 μm Luster pigment C: METASHINE (registered trademark) 1030RY produced by Nippon Sheet Glass Co., Ltd., core: glass, covering material: titanium oxide, average particle size: 30 μm Luster pigment D: FANTASPEARL (registered trademark) 1060YR produced by Nihon Koken Kogyo Co., Ltd., core: mica, covering material: titanium oxide, average particle size: 23 μm In Comparative Example 4, in the preparation of the adhesive layer-forming coating liquid, 50 g of the adhesive layer-forming coating liquid and 250 g of zirconia beads having a size of 0.5 mm were charged into a glass bottle. Subsequently, a dispersion treatment was performed for 30 minutes by shaking the bottle with a paint shaker (produced by ASADA Iron Works Co., Ltd.).

Comparative Example 5

A thermal transfer sheet was produced as in Example 1, except that the composition of the adhesive layer-forming coating liquid was changed as described below.

<Adhesive Layer-Forming Coating Liquid (Containing Pearl Pigment)>

| | |
|---|---|
| Pearl pigment E (Iriodin/Afflair 223 produced by Merck Japan) | 10 parts by mass |
| Vinyl chloride-vinyl acetate copolymer (SOLBIN (registered trademark) CNL produced by Nissin Chemical Co., Ltd.) | 20 parts by mass |
| MEK | 35 parts by mass |
| Toluene | 35 parts by mass |

Example 10

As in Example 1, a back layer was formed on one of the surfaces of the first substrate, and colorant layers A to D were formed on a part of the other surface of the first substrate.

Then, a first peeling layer-forming coating liquid (containing a luster pigment) having the composition described below was applied in a frame sequential manner with respect to the colorant layers with a coating tester GP-10 (produced by Kurabo Industries Ltd.) heliograph plate 54L, and the resulting coating film was dried at 100° C. for 1 minute to form a first peeling layer.

An adhesive layer-forming coating liquid having the composition described below was applied to the first peeling layer, and the resulting coating film was dried to form an adhesive layer having a thickness of 1.2 μm. Hereby, a thermal transfer sheet was produced. The first peeling layer and the adhesive layer constituted the transfer layer of the thermal transfer sheet.

<First Peeling Layer-Forming Coating Liquid (Containing Luster Pigment)>

| | |
|---|---|
| Vinyl chloride-vinyl acetate copolymer (SOLBIN (registered trademark) CNL produced by Nissin Chemical Co., Ltd.) | 15 parts by mass |
| Polyester (VYLON (registered trademark) 220 produced by Toyobo Co., Ltd.) | 4 parts by mass |
| Polyester (VYLON (registered trademark) 200 produced by Toyobo Co., Ltd.) | 1 part by mass |
| Luster pigment A | 10 parts by mass |
| MEK | 35 parts by mass |
| Toluene | 35 parts by mass |

<Adhesive Layer-Forming Coating Liquid>

| | |
|---|---|
| Vinyl chloride-vinyl acetate copolymer (SOLBIN (registered trademark) CNL produced by Nissin Chemical Co., Ltd.) | 30 parts by mass |
| MEK | 35 parts by mass |
| Toluene | 35 parts by mass |

Example 11

As in Example 1, a back layer was formed on one of the surfaces of the first substrate, and colorant layers A to D and a first peeling layer were formed on the other surface of the first substrate.

Then, an intermediate layer-forming coating liquid (containing a luster pigment) having the composition described below was applied to the first peeling layer with a coating tester GP-10 (produced by Kurabo Industries Ltd.) heliograph plate 54L, and the resulting coating film was dried at 100° C. for 1 minute to form an intermediate layer.

An adhesive layer-forming coating liquid that was the same as that used in Example 10 was applied to the intermediate layer, and the resulting coating film was dried to form an adhesive layer having a thickness of 1.0 μm. Hereby, a thermal transfer sheet was produced. The first peeling layer, the intermediate layer, and the adhesive layer constituted the transfer layer of the thermal transfer sheet.

<Intermediate Layer-Forming Coating Liquid>

| | |
|---|---|
| Polyester (elitel (registered trademark) UE-320 produced by Unitika Ltd.) | 11 parts by mass |
| Polyester (VYLON (registered trademark) GK250 produced by Toyobo Co., Ltd.) | 7 parts by mass |
| Polyester (VYLON (registered trademark) 200 produced by Toyobo Co., Ltd.) | 2 parts by mass |
| Luster pigment A | 10 parts by mass |
| MEK | 35 parts by mass |
| Toluene | 35 parts by mass |

[Production of Intermediate Transfer Medium]

A PET film having a thickness of 12 μm (Lumirror (registered trademark) produced by Toray Industries, Inc.) was provided as a second substrate. A second peeling layer-forming coating liquid having the composition described below was applied onto one of the surfaces of the second substrate, and the resulting coating film was dried to form a second peeling layer having a thickness of 1 μm. A protective layer-forming coating liquid having the composition described below was applied to the second peeling layer, and the resulting coating film was dried to form a protective layer having a thickness of 2 μm. A receiving layer-forming coating liquid having the composition described below was applied to the protective layer, and the resulting coating film was dried to form a receiving layer having a thickness of 2 μm. Hereby, an intermediate transfer medium was produced. The second peeling layer, the protective layer, and the receiving layer constituted the retransfer layer of the intermediate transfer medium.

<Second Peeling Layer-Forming Coating Liquid>

| | |
|---|---|
| (Meth)acrylic resin (DIANAL (registered trademark) BR-87 produced by Mitsubishi Chemical Corporation) | 9.5 parts by mass |
| Polyester (VYLON (registered trademark) 200 produced by Toyobo Co., Ltd.) | 0.5 parts by mass |
| Toluene | 20 parts by mass |
| MEK | 20 parts by mass |

<Protective Layer-Forming Coating Liquid>

| | |
|---|---|
| (Meth)acryl polyol resin (6KW-700 produced by Taisei Fine Chemical Co., Ltd., solid content: 36.5%, Tg: 102° C., Mw: 55000, hydroxyl value: 30.1) | 100 parts by mass |
| Isocyanate compound (TAKENATE (registered trademark) D110N produced by Mitsui Chemicals, Inc., solid content: 75%) | 3.6 parts by mass |
| MEK | 92 parts by mass |

<Receiving Layer-Forming Coating Liquid>

| | |
|---|---|
| Vinyl chloride-vinyl acetate copolymer (SOLBIN (registered trademark) CNL produced by Nissin Chemical Co., Ltd.) | 95 parts by mass |
| Epoxy modified silicone oil (KP-1800U produced by Shin-Etsu Chemical Co., Ltd.) | 5 parts by mass |
| Toluene | 200 parts by mass |
| MEK | 200 parts by mass |

<<Image Capture and Image Analysis>>

Figure 6:
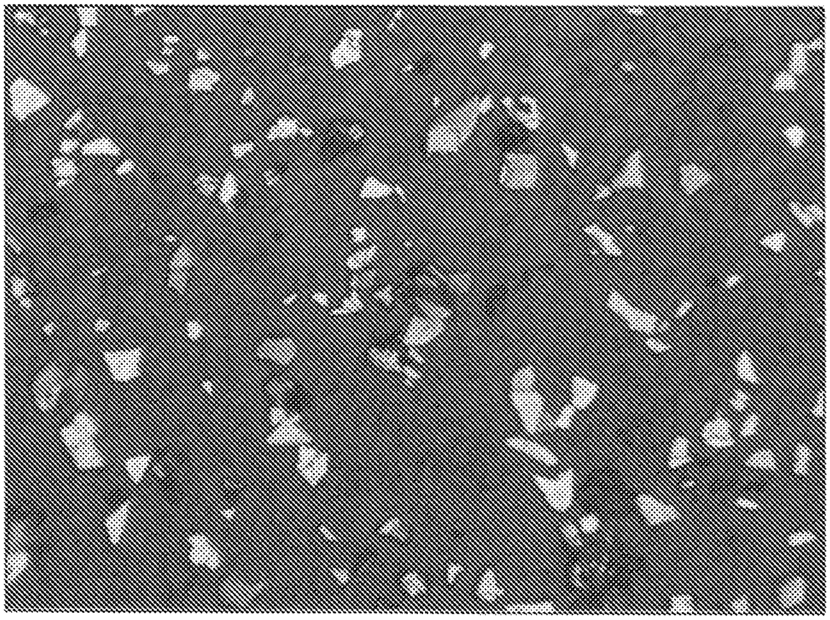
FIG. 6 is an image of a thermal transfer sheet prepared in Example 1 which is taken from a side on which a transfer layer is present at a 500-fold magnification.

An image of the thermal transfer sheet produced in Example 1 was taken from a side on which the transfer layer was present using an optical microscope at a 500-fold magnification in order to obtain an 8-bit grayscale image (FIG. 6). The optical microscope used was a digital microscope VHX-500 produced by Keyence Corporation.

Figure 7:
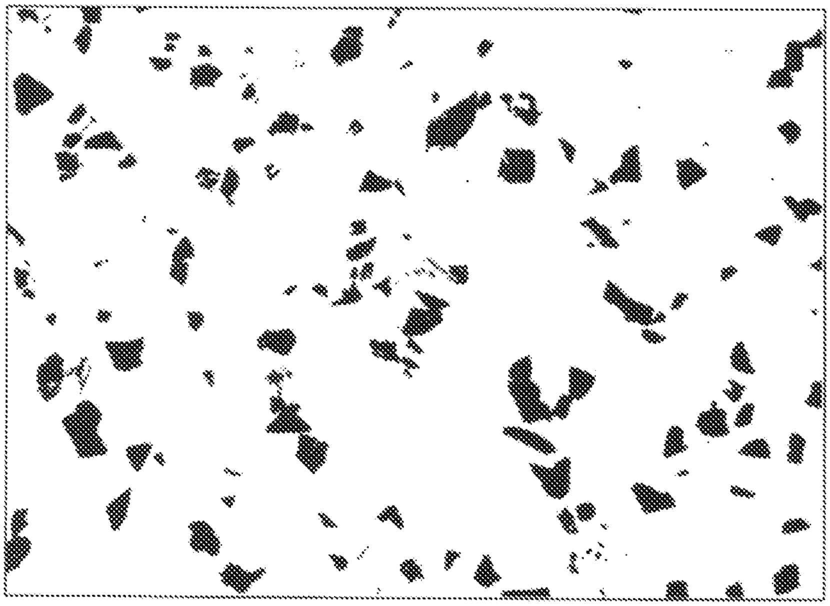
FIG. 7 is an image formed by converting the image of FIG. 6 into a binary representation.

The image was analyzed with image analysis software. Dark and light portions of the analyzed image were inverted. Automatic thresholding was then performed by an ISO-DATA method in order to determine a threshold value of a brightness distribution of the analyzed image. Binary representation was subsequently performed such that portions in which brightness was less than the threshold value were colored in black and portions in which brightness was equal to or more than the threshold value were colored in white (FIG. 7). The number and the total area of the black portions and the total area of the white portions were calculated. The image analysis software used was ImageJ.

On the basis of the above data, the ratio of the total area of the black portions to the total area of the white portions and the average area of the black portions were calculated. Table 1 lists the calculation results.

In Examples 2 to 11 and Comparative Examples 1 to 5, the ratio of the total area of the black portions to the total area of the white portions and the average area of the black portions were calculated in the same manner as described above. Table 1 lists the calculation results.

<<First Transferability Evaluation>>

An image was formed on the retransfer layer of the intermediate transfer medium using the test printer described below with one of the thermal transfer sheets produced in Examples and Comparative Examples. The image was formed by transferring the colorants contained in the colorant layers A to D. Subsequently, the transfer layer of the thermal transfer sheet was transferred to the image.

<Test Printer>

Thermal head: KEE-57-12GAN2-STA produced by KYOCERA Corporation

Average resistance of heating element: 3303 Ω

Resolution in main scanning direction: 300 dpi (dot per inch)

Resolution in sub scanning direction: 300 dpi

Line speed: 3.0 msec./line

Printing start temperature: 35° C.

Pulse Duty ratio: 70%

The transfer layer transferred on the intermediate transfer medium was visually inspected, and an evaluation was made in accordance with the following evaluation criteria. Table 1 lists the evaluation results.

(Evaluation Criteria)

A: Wrinkles were absent in the surface of the transfer layer

B: Shallow wrinkles were present in the surface of the transfer layer

C: Deep wrinkles were present in the surface of the transfer layer

<<Second Transferability Evaluation>>

The intermediate transfer medium that included the transfer layer disposed on the retransfer layer, which was produced in the evaluation of first transferability, a polyvinyl chloride (PVC) card, and a laminator (Lamipacker LPD3212 produced by Fujipla) were provided.

The retransfer layer and transfer layer of the intermediate transfer medium were second-transferred to the PVC card at a temperature of 175° C. and a speed of 40 mm/s. Hereby, a printed material was produced.

The printed material was visually inspected, and an evaluation was made in accordance with the following evaluation criteria. Table 1 lists the evaluation results. Note that the transfer failure portion (%) is the proportion of the region in which the transfer was not achieved with the retransfer layer and the transfer layer, which were to be transferred, being 100%.

(Evaluation Criteria)

A: The transfer failure portion of the printed material was less than 5%

B: The transfer failure portion of the printed material was 5% or more and less than 10%

C: The transfer failure portion of the printed material was 10% or more

<<Brightness Evaluation>>

The printed material produced in the evaluation of second transferability was visually inspected and evaluated in accordance with the following evaluation criteria. Table 1 lists the evaluation results. Note that the expression "shiny brightness" used herein refers to a shiny appearance produced due to the particle size, particle size distribution, reflection properties, and alignment conditions of the luster pigment, such as a sparkling appearance or a glinting appearance.

(Evaluation Criteria)

S: The printed material had an excellent shiny brightness

A: The printed material had a suitable shiny brightness

B: The printed material had a shiny brightness

C: The printed material had a poor shiny brightness

<<Image Visibility Evaluation>>

The printed material produced in the evaluation of second transferability was visually inspected and evaluated in accordance with the following evaluation criteria.

(Evaluation Criteria)

A: The image could be clearly confirmed

B: The image could be confirmed

C: The image was hardly confirmed

<<Durability Evaluation>>

The durability of the printed material produced in the evaluation of second transferability was determined by the Taber testing method conforming to ANSI-INCITS322-2002,5.9 Surface Abrasion. In the Taber testing method, an abrasion test was conducted for 250 cycles using a Taber testing machine and an abrasion wheel CS-10F at a load of 500 gf and 60 cycle/min. The conditions of the printed material that had been subjected to the abrasion test were visually inspected. The durability of the printed material was evaluated in accordance with the following evaluation criteria. Table 1 lists the evaluation results.

(Evaluation Criteria)

S: Scratches were not present in the image at all

A: A few scratches were present in the image, but could hardly be visually confirmed B: Scratches could be visually confirmed in the image, but do not cause problems in practical use C: Considerable scratches were visually confirmed in the image

TABLE 1

| | Layer containing luster pigment | Type of luster pigment | PV ratio of coating liquid | Average area of black portions ($\mu m^2$) | Area ratio (black/white portions) | Number of grooves in heliograph plate | Evaluation results | | | | |
|---|---|---|---|---|---|---|---|---|---|---|---|
| | | | | | | | First transferability | Second transferability | Brightness | Image visibility | Durability |
| Example 1 | Adhesive layer | A | 0.15 | 153.7 | 0.040 | 54 | A | A | B | A | S |
| Example 2 | Adhesive layer | A | 0.5 | 123.1 | 0.160 | 54 | A | A | A | A | B |
| Example 3 | Adhesive layer | A | 1 | 153.0 | 0.230 | 54 | B | A | S | B | B |
| Example 4 | Adhesive layer | A | 0.5 | 136.5 | 0.100 | 80 | A | A | A | A | A |
| Example 5 | Adhesive layer | A | 2 | 150.1 | 0.450 | 54 | B | A | S | B | B |
| Example 6 | Adhesive layer | B | 0.5 | 275.1 | 0.150 | 54 | A | A | A | A | B |
| Example 7 | Adhesive layer | B | 1 | 298.5 | 0.300 | 54 | A | A | S | B | B |
| Example 8 | Adhesive layer | C | 0.5 | 256.6 | 0.140 | 54 | A | A | B | A | B |
| Example 9 | Adhesive layer | D | 0.5 | 193.4 | 0.150 | 54 | A | A | B | B | B |
| Example 10 | Peeling layer | A | 0.5 | 150.0 | 0.100 | 54 | A | A | A | A | B |
| Example 11 | Intermediate layer | A | 0.5 | 150.0 | 0.100 | 54 | A | B | A | A | S |
| Comparative Example 1 | Adhesive layer | A | 0.1 | 151.5 | 0.020 | 54 | A | A | C | A | S |
| Comparative Example 2 | Adhesive layer | A | 3 | 161.4 | 0.550 | 54 | C | B | S | B | C |

TABLE 1-continued

| | Layer containing luster pigment | Type of luster pigment | PV ratio of coating liquid | Average area of black portions ($\mu m^2$) | Area ratio (black/white portions) | Number of grooves in heliograph plate | Evaluation results: First transfer-ability | Second transfer-ability | Brightness | Image visibility | Durability |
|---|---|---|---|---|---|---|---|---|---|---|---|
| Comparative Example 3 | Adhesive layer | B | 2.5 | 231.6 | 0.550 | 54 | C | C | S | C | C |
| Comparative Example 4 | Adhesive layer | A | 0.5 | 70.0 | 0.100 | 54 | A | A | C | A | A |
| Comparative Example 5 | Adhesive layer | E | 0.5 | 350.0 | 0.100 | 54 | C | C | S | B | C |

REFERENCE SIGNS LIST

10: thermal transfer sheet, 11: substrate, 12: transfer layer, 13: adhesive layer, 14: peeling layer, 15: intermediate layer, 20: combination of thermal transfer sheet and intermediate transfer medium, 30: intermediate transfer medium, 31: second substrate, 32: retransfer layer

The invention claimed is:

1. A thermal transfer sheet comprising:

a substrate; and a transfer layer, wherein the transfer layer contains a luster pigment, wherein the luster pigment is a coated pigment including a core and a covering material that covers the core, wherein the core contains glass, and the covering material contains gold or silver, wherein, when an image of the thermal transfer sheet is taken from a side on which the transfer layer is present using an optical microscope at a 500-fold magnification in order to obtain an 8-bit grayscale image, the image is analyzed with image analysis software, dark and light portions of the analyzed image are inverted, automatic thresholding is then performed by an ISO-DATA method in order to determine a threshold value of a brightness distribution of the analyzed image, binary representation is subsequently performed such that portions in which brightness is less than the threshold value are colored in black and portions in which brightness is equal to or more than the threshold value are colored in white, and the number and the total area of the black portions and the total area of the white portions are calculated, wherein a ratio of the total area of the black portions to the total area of the white portions is 0.03 or more and 0.5 or less, and wherein the black portions have an average area of 100 μm2 or more and 300 μm2 or less.

2. The thermal transfer sheet according to claim 1, wherein the transfer layer includes an adhesive layer.

3. The thermal transfer sheet according to claim 2, wherein the transfer layer further includes a peeling layer, and wherein the peeling layer is interposed between the substrate and the adhesive layer.

4. The thermal transfer sheet according to claim 3, wherein the transfer layer further includes an intermediate layer, wherein the intermediate layer is interposed between the peeling layer and the adhesive layer, and wherein one or more layers selected from the peeling layer, the intermediate layer, and the adhesive layer contain a luster pigment.

5. The thermal transfer sheet according to claim 1, further comprising a colorant layer disposed on the substrate, wherein the colorant layer and the transfer layer are arranged on the substrate in a frame sequential manner.

6. The thermal transfer sheet according to claim 1, wherein the transfer layer includes a receiving layer that serves as a surface layer.

7. A combination of the thermal transfer sheet according to claim 1 and an intermediate transfer medium.

* * * * *